US009234566B2

(12) United States Patent
Ukon

(10) Patent No.: US 9,234,566 B2
(45) Date of Patent: Jan. 12, 2016

(54) TRANSMISSION

(71) Applicant: Fuji Jukogyo Kabushiki Kaisha, Tokyo (JP)

(72) Inventor: Yasuyuki Ukon, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/018,330

(22) Filed: Sep. 4, 2013

(65) Prior Publication Data

US 2014/0076080 A1   Mar. 20, 2014

(30) Foreign Application Priority Data

Sep. 14, 2012 (JP) ................................. 2012-202463

(51) Int. Cl.
| F16H 57/00 | (2012.01) |
| F16H 3/083 | (2006.01) |
| F16H 63/30 | (2006.01) |
| F16D 7/02 | (2006.01) |
| F16D 11/10 | (2006.01) |
| F16D 21/04 | (2006.01) |
| F16D 47/02 | (2006.01) |
| F16H 3/091 | (2006.01) |

(52) U.S. Cl.
CPC ................ *F16H 3/083* (2013.01); *F16D 7/027* (2013.01); *F16D 11/10* (2013.01); *F16D 21/04* (2013.01); *F16D 47/02* (2013.01); *F16H 63/30* (2013.01); *F16H 3/0915* (2013.01); *F16H 57/0006* (2013.01); *F16H 2063/3093* (2013.01); *F16H 2200/2094* (2013.01); *Y10T 74/19479* (2015.01)

(58) Field of Classification Search
CPC ....... F16H 3/001; F16H 3/0089; F16H 3/083; F16H 57/0006; F16F 15/121
USPC ........... 74/330, 331, 333, 411, 574.4; 464/45, 464/46

See application file for complete search history.

(56) References Cited

U.S. PATENT DOCUMENTS

| 5,185,543 A  * | 2/1993 | Tebbe .............................. 310/51 |
| 7,927,219 B2 * | 4/2011 | Saeki et al. ...................... 464/46 |
| 8,171,814 B2 | 5/2012 | Martin et al. |
| 2009/0227419 A1 | 9/2009 | Martin et al. |
| 2009/0255357 A1* | 10/2009 | Martin et al. ................... 74/335 |

(Continued)

FOREIGN PATENT DOCUMENTS

| DE | 41 26 687 | * 2/1992 |
| JP | 2009-536713 A | 10/2009 |
| JP | 2010-510464 A | 4/2010 |

(Continued)

*Primary Examiner* — William C Joyce
(74) *Attorney, Agent, or Firm* — McGinn IP Law Group PLLC

(57) ABSTRACT

In a transmission, an input shaft connected to a startup clutch includes a first input shaft and a second input shaft. Drive gears are fixed to a first main shaft and a second main shaft, and driven gears are provided on an output shaft to be free to rotate relative thereto. The driven gears are connected to and disconnected from the output shaft by a gear switching mechanism. A shaft switching mechanism that switches a power transmission path between the first main shaft and the second main shaft is provided on the first main shaft, the second main shaft, and the second input shaft. A damping mechanism is provided between the first input shaft and the second input shaft in order to cut spike torque generated when the power transmission path is switched, to a set torque.

6 Claims, 12 Drawing Sheets

(56) References Cited

U.S. PATENT DOCUMENTS

2010/0257969 A1 10/2010 Martin et al.
2012/0304789 A1* 12/2012 Misu et al. ................. 74/331

FOREIGN PATENT DOCUMENTS

| WO | WO 2007/132209 A2 | 11/2007 |
| WO | WO 2008/062192 A1 | 5/2008 |

* cited by examiner

TRANSMISSION

CROSS-REFERENCE TO RELATED APPLICATIONS

The present application claims priority from Japanese Patent Application No. 2012-202463, filed on Sep. 14, 2012, the entire contents of which are hereby incorporated by reference.

BACKGROUND

1. Technical Field

The present invention relates mainly to transmissions for vehicles.

2. Related Art

Conventional transmissions include a transmission disclosed in Japanese Unexamined Patent Application Publication (Translation of PCT Application) (JP-T) No. 2009-536713. This transmission includes a low gear and a high gear that are attached to an output shaft so as to freely rotate, a hub fixed to the shaft between the low gear and the high gear, and a first key and a second key that are attached to the hub so as to move freely in an axial direction and rotate integrally therewith in a circumferential direction.

According to this transmission, when the first key and the second key are moved to the low gear by an actuator during acceleration, for example, the first key engages with a dog provided on a side face of the low gear such that power transmission between the low gear and the hub is realized by the first key alone. At this time, the second key is disengaged from the low gear and can therefore be moved to the high gear while power transmission via the first key is underway.

When the second key is moved to the high gear, the second key engages with a dog provided on a side face of the high gear such that power transmission between the high gear and the hub is realized by the second key. When a power transmission path is switched from the low gear to the high gear, a rotation speed of the shaft decreases, and therefore the engagement between the first key and the low gear is released at the same time as the switch in the power transmission path so that the first key can be switched to the high gear. By moving the first key to the high gear, a gear shift (an upshift) from the low gear to the high gear can be completed without causing torque interruption.

In the transmission described above, however, each of the keys is engaged with the corresponding gear in a condition where a rotation speed difference exists between the key and the gear (to be referred to hereafter as "differential rotation"), and therefore, when the key engages with the dog of the gear, torque variation (to be referred to hereafter as "spike torque") occurs in which the torque jumps momentarily and then returns to normal. When spike torque is generated during a gear shift in this manner, an impact sound is generated by the engagement between the key and the dog, noise is generated when an outer race of a bearing that supports the shaft impinges on a transmission case, and so on. Moreover, the spike torque may generate torsion in the shaft, which causes vibration in a drive wheel and the transmission case.

Hence, a transmission that suppresses noise and vibration by incorporating a damping mechanism constituted by an elastic body in gears in order to absorb the spike torque, such as that disclosed in JP-T No. 2010-510464, has been proposed.

In the transmission disclosed in JP-T No. 2010-510464, however, noise and vibration are not suppressed efficiently, and therefore vibration is generated in a vehicle in which the transmission is installed, causing discomfort to a passenger of the vehicle. Further, the damping mechanism is incorporated into all gears, leading to increases in the cost and size of the transmission. Moreover, incorporating the damping mechanism into the gears leads to a reduction in a rigidity of the gears: particularly when the damping mechanism is incorporated into a gear having a small diameter, it is impossible to secure a sufficient damping function.

SUMMARY OF THE INVENTION

The present invention has been designed in consideration of the circumstances described above, and an object thereof is to provide a transmission that achieves reductions in cost and size while improving a function for damping spike torque generated during a gear shift, whereby passenger comfort in a vehicle can be enhanced.

An aspect of the present invention provides a transmission including: an input shaft that is rotated by a driving force of an engine; a first main shaft and a second main shaft that are disposed to be free to rotate relative to the input shaft; pluralities of drive gears fixed respectively to the first main shaft and the second main shaft; an output shaft that is disposed parallel to the input shaft, the first main shaft, and the second main shaft; driven gears that are disposed on the output shaft to be free to rotate relative thereto and mesh respectively with the pluralities of drive gears; a gear switching mechanism to switch selectively between a connected condition in which a driven gear is connected to the output shaft so that the driven gears rotate integrally with the output shaft, and a disconnected condition in which the output shaft and the driven gears are capable of rotating relatively; and a shaft switching mechanism to switch a transmission path of a rotary power of the input shaft selectively between the first main shaft and the second main shaft. The shaft switching mechanism includes: an engagement member provided either on each of the first main shaft and the second main shaft or on the input shaft to be capable of moving in an axial direction of the input shaft; and a dog provided on the other of each of the first and second main shafts and the input shaft so as to engage with the engagement member when the engagement member moves, thereby causing either one of the first main shaft and the second main shaft to rotate integrally with the input shaft. The input shaft is provided with a damping mechanism that generates a sliding motion when torque variation occurs as a result of the engagement between the engagement member and the dog, thereby cutting the torque variation to a preset set torque.

Another aspect of the present invention provides a transmission including: an input shaft that is rotated by a driving force of an engine; a first main shaft and a second main shaft that are disposed to be free to rotate relative to the input shaft; pluralities of drive gears provided respectively on the first main shaft and the second main shaft to be free to rotate relative thereto; a gear switching mechanism to switch selectively between a connected condition in which a drive gear is connected to either one of the first main shaft and the second main shaft such that the drive gear rotates integrally with either one of the first main shaft and the second main shaft, and a disconnected condition in which the drive gears and either one of the first main shaft and the second main shaft are capable of rotating relatively; an output shaft disposed parallel to the input shaft, the first main shaft, and the second main shaft; driven gears that are fixed to the output shaft and mesh respectively with the pluralities of drive gears; and a shaft switching mechanism to switch a transmission path of a rotary power of the input shaft selectively between the first main shaft and the second main shaft. The shaft switching mechanism includes: an engagement member provided either on each of the first main shaft and the second main shaft or on the input shaft to be capable of moving in an axial direction of the input shaft; and a dog provided on the other of each of the first and second main shafts and the input shaft so as to engage with the engagement member when the engagement member moves, thereby causing either one of the first main shaft and the second main shaft to rotate integrally with the input shaft. The input shaft is provided with a damping mechanism that generates a sliding motion when torque variation occurs as a result of the engagement between the engagement portion and the dog, thereby cutting the torque variation to a preset set torque.

The input shaft may be constituted by a first input shaft and a second input shaft disposed respectively on an upstream and a downstream of a transmission path for transmitting power from the engine, and the damping mechanism may be disposed between the first input shaft and the second input shaft so as to cause the first input shaft and the second input shaft to rotate relative to each other when torque variation at or beyond a set torque occurs.

The first main shaft may be hollow, and the input shaft may be inserted into an interior of the first main shaft to be free to rotate relative thereto.

Pluralities of drive gears having respectively different gear ratios may be provided on the first main shaft and the second main shaft such that drive gears having successive gear ratios are disposed alternately on the first main shaft and the second main shaft.

The shaft switching mechanism may include: a first switching device provided on the first main shaft; a second switching device provided on the second main shaft; and a first dog and a second dog that are provided on the input shaft and respectively include a leading surface on a front side of a rotation direction of the input shaft and a trailing surface on a rear side of the rotation direction of the input shaft. The first switching device may include: a hub fixed to the first main shaft; a first key that is held by the hub to be free to move in an axial direction of the first main shaft; and a second key that is held by the hub to be free to move in the axial direction of the first main shaft. The first key may be provided with the engagement member at one end thereof to be capable of engaging with the leading surface of the first dog. The second key may be provided with the engagement member at one end thereof to be capable of engaging with the trailing surface of the first dog. The second switching device may include: a hub fixed to the second main shaft; a second key that is held by the hub to be free to move in an axial direction of the second main shaft; and a first key that is held by the hub to be free to move in the axial direction of the second main shaft. The second key may be provided with the engagement member at one end thereof to be capable of engaging with the leading surface of the second dog. The first key may be provided with the engagement member being provided at one end thereof to be capable of engaging with the trailing surface of the second dog. Thus, when the first key and the second key of the first switching device are moved to the first dog such that either the leading surface of the first dog engages with the first key or the trailing surface of the first dog engages with the second key, a power transmission condition in which the input shaft and the first main shaft rotate integrally is established, and when the first key and the second key of the second switching device are moved to the second dog such that either the leading surface of the second dog engages with the second key or the trailing surface of the second dog engages with the first key, a power transmission condition in which the input shaft and the second main shaft rotate integrally is established.

The transmission preferably may further include an actuator to moving the first keys and the second keys of the first switching device and the second switching device. The actuator may move the first key of the first switching device in a direction for engaging with the first dog and move the first key of the second switching device in a direction heading away from the second dog simultaneously, and move the second key of the second switching device in a direction for engaging with the second dog and move the second key of the first switching device in a direction heading away from the first dog simultaneously.

The first main shaft and the second main shaft may be disposed opposite each other at a remove in the axial direction such that respective axial centers thereof are aligned. The shaft switching mechanism may include: a switching device provided on the input shaft in an opposing interval between the first main shaft and the second main shaft; a first dog that is provided on the first main shaft, includes a leading surface on a rear side of a rotation direction of the first main shaft and a trailing surface on a front side of the rotation direction of the first main shaft, and projects toward the switching device; and a second dog that is provided on the second main shaft, includes a leading surface on a rear side of a rotation direction of the second main shaft and a trailing surface on a front side of the rotation direction of the second main shaft, and projects toward the switching device. The switching device may include: a hub fixed to the input shaft; a first key that is held by the hub to be free to move in the axial direction of the input shaft, the engagement member being provided at one end thereof to be capable of engaging with the leading surface of the first dog and at another end thereof to be capable of engaging with the trailing surface of the second dog; and a second key that is held by the hub to be free to move in the axial direction of the input shaft, the engagement member being provided at one end thereof to be capable of engaging with the trailing surface of the first dog and at another end thereof to be capable of engaging with the leading surface of the second dog. Thus, when the first key and the second key of the switching device are moved to the first dog such that either the leading surface of the first dog engages with the first key or the trailing surface of the first dog engages with the second key, a power transmission condition in which the input shaft and the first main shaft rotate integrally is established, and when the first key and the second key of the switching device are moved to the second dog such that either the leading surface of the second dog engages with the second key or the trailing surface of the second dog engages with the first key, a power transmission condition in which the input shaft and the second main shaft rotate integrally is established.

DETAILED DESCRIPTION

Examples of the present invention will be described in detail below with reference to the attached drawings. Dimensions, materials, and other specific numerical values and the like indicated in these examples are merely for facilitating comprehension of the invention and, excluding specific cases to the contrary, are not intended to limit the present invention. Note that elements having substantially identical functions and configurations have been allocated identical reference symbols in the specification and drawings, and duplicate description thereof has been omitted. Further, elements not directly related to the present invention have been omitted from the drawings.

First Example

Figure 1:
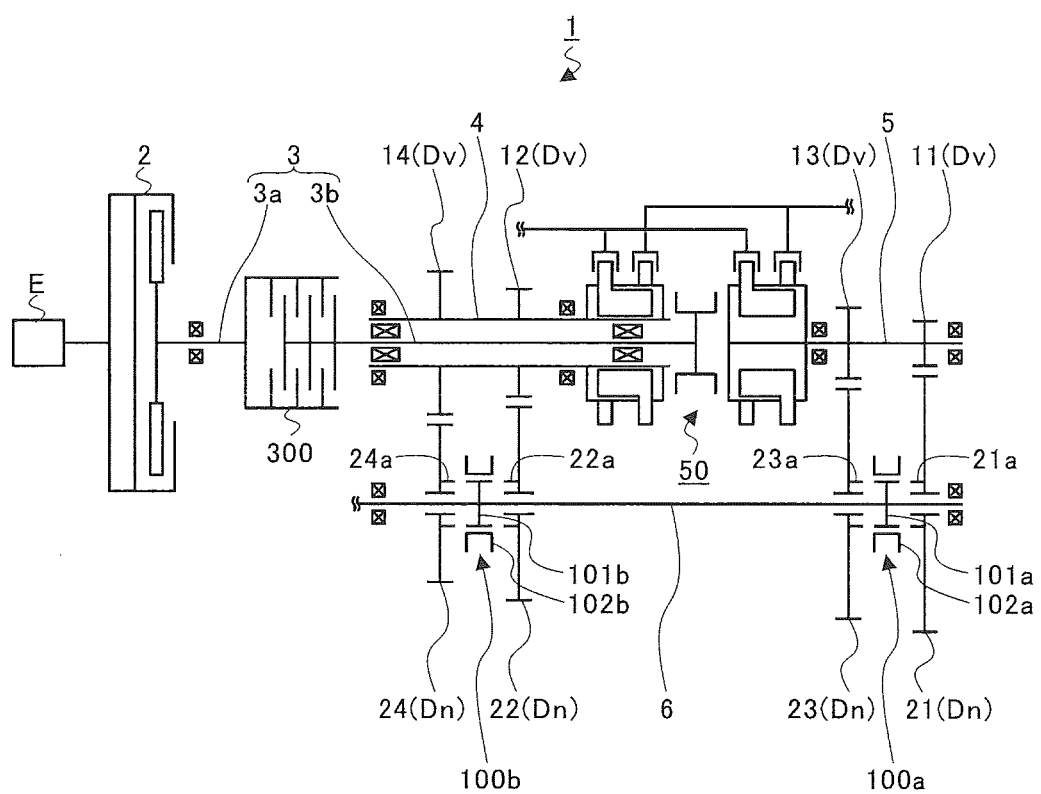
FIG. 1 is a schematic view showing a transmission for a vehicle according to a first example.

FIG. 1 is a schematic view showing a transmission 1 for a vehicle according to a first Example. The transmission 1 according to this example transmits a driving force of an engine E to a drive wheel, and includes an input shaft 3 that is supported to be free to rotate by a bearing held on a transmission case, and connected to a crankshaft of the engine E via a startup clutch 2. The input shaft 3 is rotated by the driving force of the engine E, and is constituted by a first input shaft 3a and a second input shaft 3b disposed respectively on an upstream and a downstream of a transmission path for transmitting power from the engine E. A damping mechanism 300 is provided between the first input shaft 3a and the second input shaft 3b. As will be described in more detail below, when spike torque that generates torque variation at or beyond a set torque occurs in the input shaft 3, the damping mechanism 300 generates a sliding motion to cause the first input shaft 3a and the second input shaft 3b to rotate relative to each other, whereby the spike torque is cut to a preset set torque.

The transmission 1 further includes a first main shaft 4 and a second main shaft 5 that are supported to be free to rotate by bearings held on the transmission case and disposed to be free to rotate relative to the input shaft 3. The first main shaft 4 and the second main shaft 5 are disposed parallel to the input shaft 3, and disposed opposite each other at a remove in an axial direction such that respective axial centers thereof are aligned. Further, the first main shaft 4 is hollow, and the input shaft 3 (the second input shaft 3b) is inserted into an interior of the first main shaft 4 to be free to rotate relative thereto. Furthermore, an output shaft 6 supported by a bearing to be free to rotate and disposed parallel to the input shaft 3, the first main shaft 4, and the second main shaft 5 is housed in the transmission case.

Drive gears Dv (a first drive gear 11 to a fourth drive gear 14) are fixed to the first main shaft 4 and the second main shaft 5. More specifically, the first drive gear 11 and a third drive gear 13 are fixed to the second main shaft 5, while a second drive gear 12 and the fourth drive gear 14 are fixed to the first main shaft 4. Hence, in the transmission 1 according to this example, the drive gears Dv having respectively different gear ratios are provided on the first main shaft 4 and the second main shaft 5 such that drive gears Dv having successive gear ratios are disposed alternately on the first main shaft 4 and the second main shaft 5.

The output shaft 6 is connected to the drive wheel, and driven gears Dn (a first driven gear 21 to a fourth driven gear 24) that mesh respectively with the drive gears Dv are provided on the output shaft 6 to be free to rotate relative thereto. The output shaft 6 is further provided with gear switching mechanisms 100a and 100b that switch selectively between a connected condition in which a driven gear Dn is connected to the output shaft 6 such that the driven gear Dn rotates integrally with the output shaft 6, and a disconnected condition in which the output shaft 6 and the driven gears Dn rotate relatively.

The gear switching mechanism 100a is provided between the first driven gear 21 and a third driven gear 23 such that when either one of the first driven gear 21 and the third driven gear 23 is connected to the output shaft 6, the other is disconnected from the output shaft 6.

More specifically, the gear switching mechanism 100a includes a hub 101a fixed to the output shaft 6 to be incapable of relative rotation, and a sleeve 102a held by the hub 101a to be free to move in an axial direction of the output shaft 6. The hub 101a and the sleeve 102a are provided between the first driven gear 21 and the third driven gear 23. A shift fork, not shown in the drawing, is engaged to an outer periphery of the sleeve 102a and moved in the axial direction of the output shaft 6 by an actuator such as an electric cylinder, not shown in the drawing.

The gear switching mechanism 100a further includes a hub 21a fixed to the first driven gear 21 and a hub 23a fixed to the third driven gear 23. The hubs 21a and 23a are disposed opposite each other and configured to be capable of engaging with the sleeve 102a. When the sleeve 102a is in a neutral position shown in the drawing, the sleeve 102a is disconnected from the hub 21a of the first driven gear 21 and the hub 23a of the third driven gear 23, and therefore the first driven gear 21 and the third driven gear 23 rotate relative to the output shaft 6.

When the sleeve 102a is moved to the first driven gear 21 in the axial direction, on the other hand, the sleeve 102a engages with the hub 21a of the first driven gear 21 such that the sleeve 102a is suspended between the hub 101a of the output shaft 6 and the hub 21a of the first driven gear 21. As a result, the first driven gear 21 is connected to the output shaft 6 such that the first driven gear 21 rotates integrally with the output shaft 6, while the third driven gear 23 is disconnected from the output shaft 6 such that the third driven gear 23 rotates relative to the output shaft 6. Further, when the sleeve 102a is moved to the third driven gear 23 in the axial direction, the sleeve 102a engages with the hub 23a of the third driven gear 23 such that the sleeve 102a is suspended between the hub 101a of the output shaft 6 and the hub 23a of the third driven gear 23. As a result, the third driven gear 23 is connected to the output shaft 6 such that the third driven gear 23 rotates integrally with the output shaft 6, while the first driven gear 21 is disconnected from the output shaft 6 such that the first driven gear 21 rotates relative to the output shaft 6.

The gear switching mechanism 100b is configured similarly to the gear switching mechanism 100a. In other words, the gear switching mechanism 100b includes a hub 101b fixed to the output shaft 6 to be incapable of relative rotation, a sleeve 102b held by the hub 101b to be free to move in the axial direction of the output shaft 6, a hub 22a fixed to the second driven gear 22, and a hub 24a fixed to the fourth driven gear 24, which are provided between the second driven gear 22 and the fourth driven gear 24. When the sleeve 102b is in the neutral position shown in the drawing, the sleeve 102b is disconnected from the hub 22a of the second driven gear 22 and the hub 24a of the fourth driven gear 24, and therefore the second driven gear 22 and the fourth driven gear 24 rotate relative to the output shaft 6.

When the sleeve 102b is moved to the second driven gear 22 in the axial direction, on the other hand, the sleeve 102b engages with the hub 22a of the second driven gear 22 such that the sleeve 102b is suspended between the hub 101b of the output shaft 6 and the hub 22a of the second driven gear 22. As a result, the second driven gear 22 is connected to the output shaft 6 such that the second driven gear 22 rotates integrally with the output shaft 6, while the fourth driven gear 24 is disconnected from the output shaft 6 such that the fourth driven gear 24 rotates relative to the output shaft 6. Further, when the sleeve 102b is moved to the fourth driven gear 24 in the axial direction, the sleeve 102b engages with the hub 24a of the fourth driven gear 24 such that the sleeve 102b is suspended between the hub 101b of the output shaft 6 and the hub 24a of the fourth driven gear 24. As a result, the fourth driven gear 24 is connected to the output shaft 6 such that the fourth driven gear 24 rotates integrally with the output shaft 6, while the second driven gear 22 is disconnected from the output shaft 6 such that the second driven gear 22 rotates relative to the output shaft 6.

Synchromesh mechanisms (synchronization mechanisms) are provided respectively between the sleeve 102a and the hub 21a of the first driven gear 21, between the sleeve 102a and the hub 23a of the third driven gear 23, between the sleeve 102b and the hub 22a of the second driven gear 22, and between the sleeve 102b and the hub 24a of the fourth driven gear 24.

As shown in FIG. 1, the transmission 1 includes a shaft switching mechanism 50 for selectively switching a transmission path of rotary power from the input shaft 3 between the first main shaft 4 and the second main shaft 5. The shaft switching mechanism 50 causes the input shaft 3 and the first main shaft 4 to rotate integrally when the first main shaft 4 is selected as the power transmission path, and causes the input shaft 3 and the second main shaft 5 to rotate integrally when the second main shaft 5 is selected as the power transmission path. A configuration of the shaft switching mechanism 50 will now be described in detail.

Figure 2:
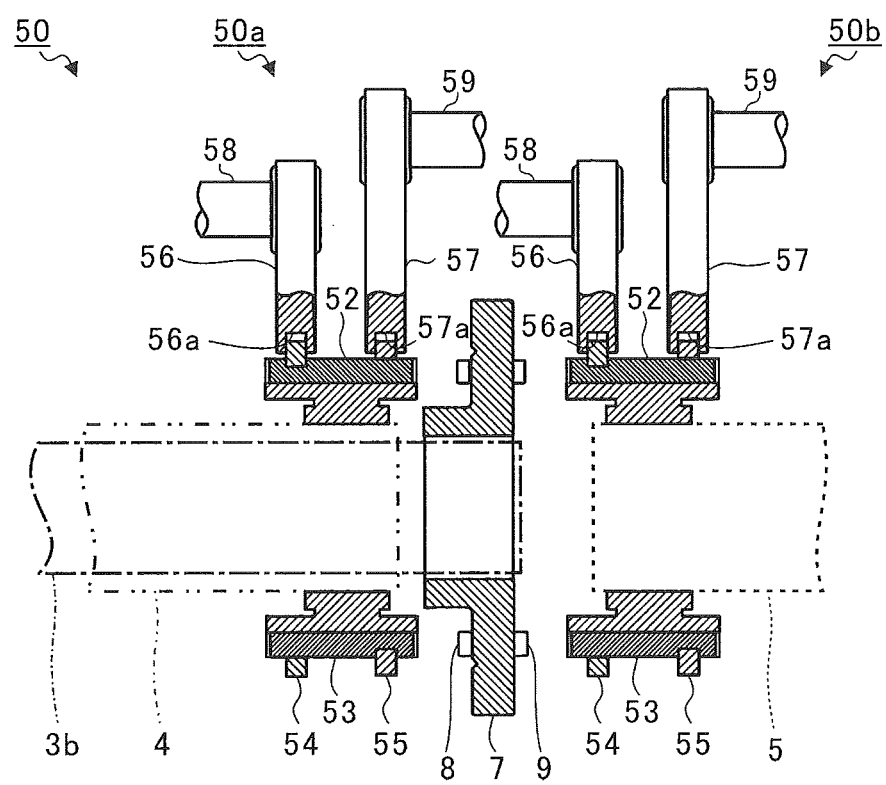
FIG. 2 is a schematic sectional view illustrating a shaft switching mechanism.

FIG. 2 is a schematic sectional view illustrating the shaft switching mechanism 50. The shaft switching mechanism 50 is constituted by a rotation transmitter 7 provided on the second input shaft 3b, a first switching device 50a (a shaft switching device) provided on the first main shaft 4, and a second switching device 50b (a shaft switching device) provided on the second main shaft 5. As shown in FIGS. 1 and 2, the second input shaft 3b is formed to have a greater shaft length than the first main shaft 4 such that an end of the second input shaft 3b on an opposite side to an end thereof provided with the damping mechanism 300 projects from the hollow first main shaft 4 in the axial direction. The rotation transmitter 7 is provided in a site of the second input shaft 3b that projects from the first main shaft 4, or in other words between the first main shaft 4 and the second main shaft 5.

The rotation transmitter 7 is spline-engaged to the end of the second input shaft 3b so as to rotate integrally with the second input shaft 3b while axial direction movement thereof is restricted. As will be described in more detail below, the rotation transmitter 7 is provided with multiple first dogs 8 (six in this example) formed at equal intervals in a circumferential direction so as to project from a side face positioned on the first switching device 50a side, and multiple second dogs 9 (six in this example) formed at equal intervals in the circumferential direction so as to project from a side face positioned on the second switching device 50b side.

Further, the first switching device 50a is provided on a rotation transmitter 7 side end of the first main shaft 4, while the second switching device 50b is provided on a rotation transmitter 7 side end of the second main shaft 5. The first switching device 50a and the second switching device 50b are identically configured apart from having certain components with different dimensions.

Figure 3:
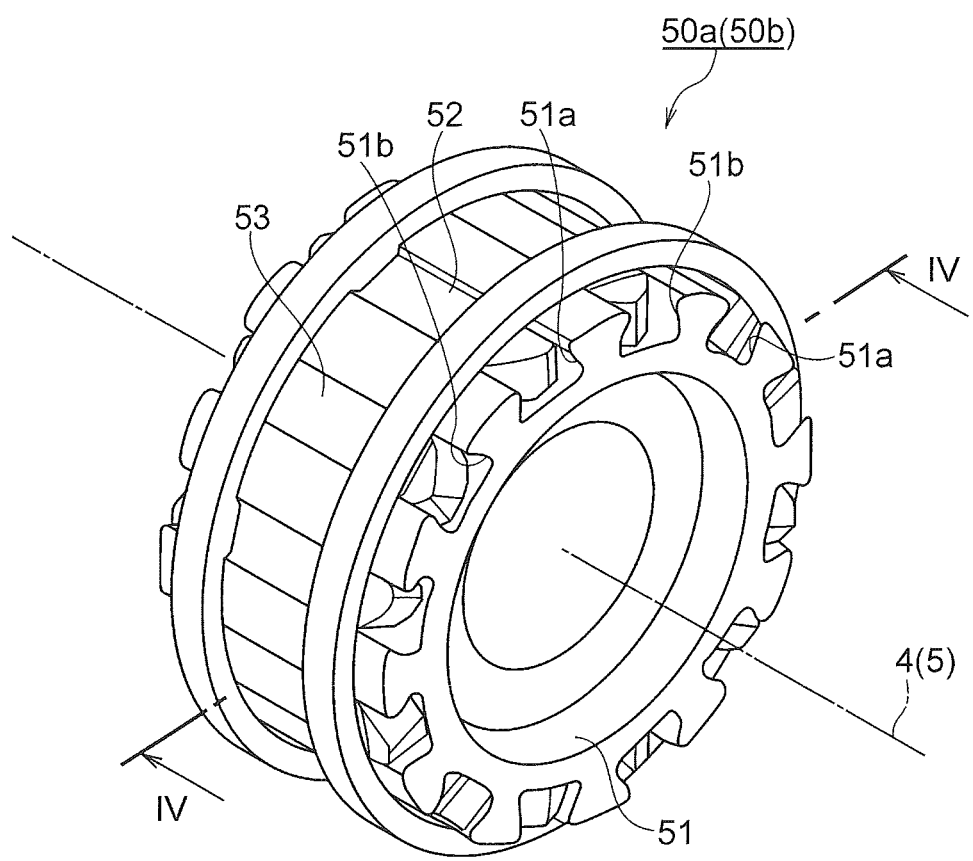
FIG. 3 is a partial perspective view showing a shaft switching device.
Figure 4:
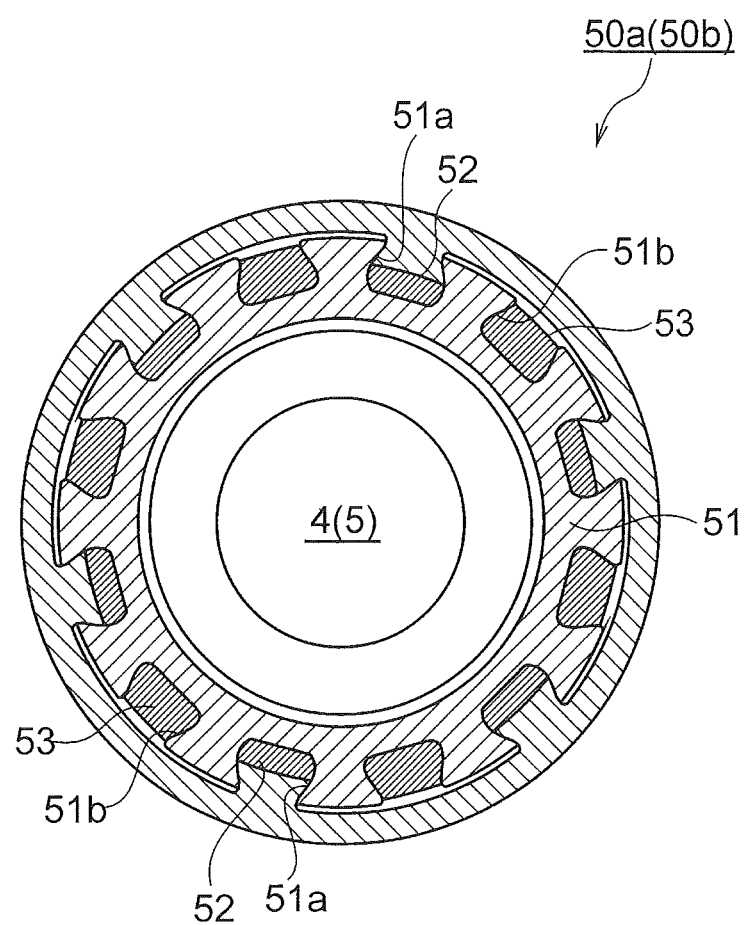
FIG. 4 is a sectional view taken along the IV-IV line in FIG. 3.

FIG. 3 is a partial perspective view of the shaft switching device, and FIG. 4 is a sectional view taken along the IV-IV line in FIG. 3. The first switching device 50a (the second switching device 50b) includes a substantially cylindrical hub 51 that is fixed to the first main shaft 4 (the second main shaft 5) so as to rotate integrally with the first main shaft 4 (the second main shaft 5). Multiple key grooves, more specifically a first key groove 51a and a second key groove 51b, are formed in an outer peripheral surface of the hub 51 alternately at equal intervals in a circumferential direction of the hub 51. Here, six first key grooves 51a and six second key grooves 51b are formed, but there are no particular limitations on the numbers of first key grooves 51a and second key grooves 51b.

The first key grooves 51a and the second key grooves 51b are formed in the axial direction of the first main shaft 4 (the second main shaft 5). The first key grooves 51a and the second key grooves 51b are all shaped such that a width thereof (a width in the circumferential direction of the hub 51) increases gradually from the outer peripheral surface of the hub 51 toward a center, or in other words from an opening toward a bottom. First keys 52 are held in the first key grooves 51a, and second keys 53 are held in the second key grooves 51b. The first keys 52 and the second keys 53 are held respectively in the first key grooves 51a and the second key grooves 51b to be free to move in the axial direction of the first main shaft 4 (the second main shaft 5) and so as to rotate integrally with the hub 51.

Figure 5:
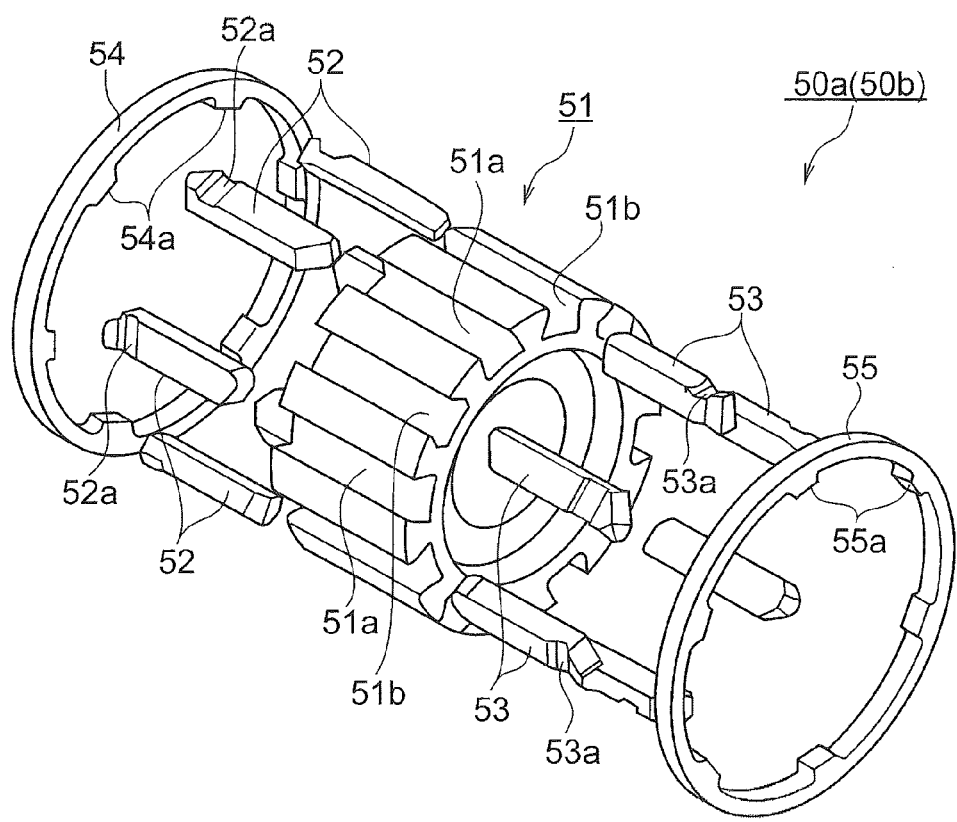
FIG. 5 is an exploded view of FIG. 3.

FIG. 5 is an exploded view of FIG. 3. As shown in FIG. 5, a ring engagement groove 52a is formed in the first key 52, and a ring engagement groove 53a is formed in the second key 53. When the first key 52 is entirely housed in the first key groove 51a, the ring engagement groove 52a formed in the first key 52 is positioned near one end of the hub 51, and when the second key 53 is entirely housed in the second key groove 51b, the ring engagement groove 53a formed in the second key 53 is positioned near another end of the hub 51.

The first switching device 50a (the second switching device 50b) also includes a first sleeve ring 54 and a second sleeve ring 55. The first sleeve ring 54 includes engagement pieces 54a that project from an inner peripheral surface thereof toward a center of the first sleeve ring 54, and the second sleeve ring 55 includes engagement pieces 55a that project from an inner peripheral surface thereof toward a center of the second sleeve ring 55. The engagement pieces 54a of the first sleeve ring 54 are capable of engaging with the ring engagement grooves 52a of the first keys 52, and are disposed at equal intervals in the circumferential direction in an equal number to the first keys 52. Similarly, the engagement pieces 55a of the second sleeve ring 55 are capable of engaging with the ring engagement grooves 53a of the second keys 53, and are disposed at equal intervals in the circumferential direction in an equal number to the second keys 53.

Figure 6:
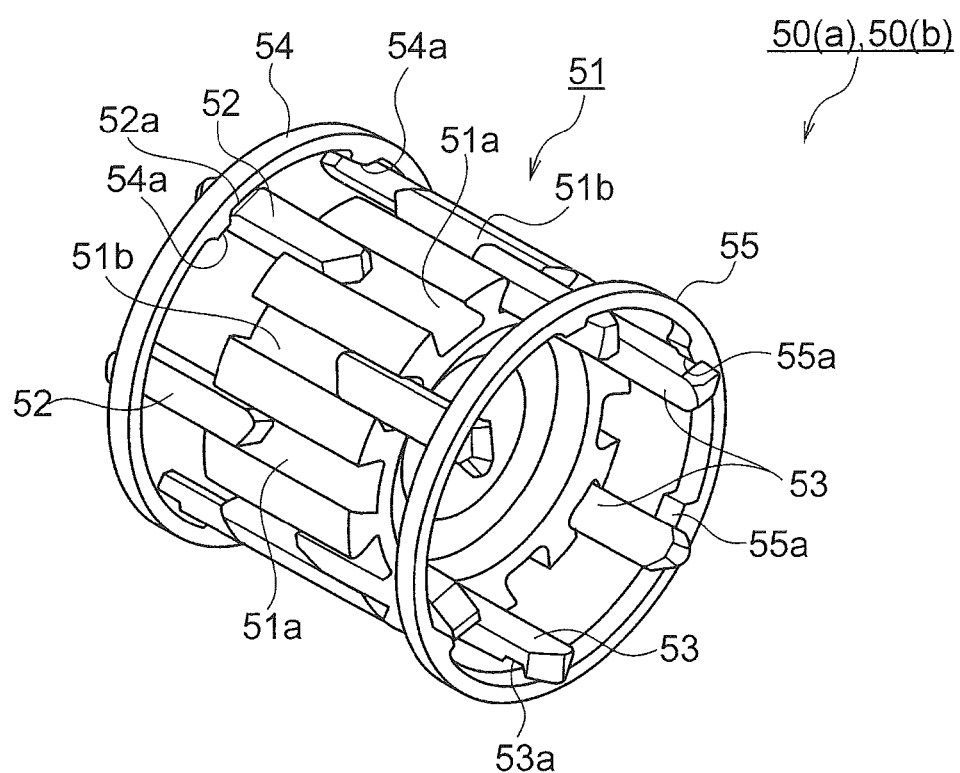
FIG. 6 is a view showing an assembly process of a switching device.

FIG. 6 is a view showing a process for assembling the switching devices 50a, 50b. To attach the first keys 52, the second keys 53, the first sleeve ring 54, and the second sleeve ring 55 to the hub 51, first, the first keys 52 are housed in the first key grooves 51a of the hub 51 and the second keys 53 are housed in the second key grooves 51b of the hub 51. At this time, the first keys 52 are disposed such that the ring engagement grooves 52a project from the first key grooves 51a in the axial direction, and the second keys 53 are disposed such that the ring engagement grooves 53a project from the second key grooves 51b in the axial direction. Next, the first keys 52 are inserted into the first sleeve ring 54, whereupon the first sleeve ring 54 is rotated in the circumferential direction such that the engagement pieces 54a engage with the ring engagement grooves 52a in the first keys 52. Similarly, the second keys 53 are inserted into the second sleeve ring 55, whereupon the second sleeve ring 55 is rotated in the circumferential direction such that the engagement pieces 55a engage with the ring engagement grooves 53a in the second keys 53.

Then, the first keys 52 and the second keys 53 are moved in the axial direction, and when the first keys 52 and the second keys 53 are housed entirely in the first key grooves 51a and the second key grooves 51b of the hub 51, the assembly is complete, whereby the condition shown in FIG. 3 is obtained. In this condition, the engagement pieces 54a of the first sleeve ring 54 are also engaged with the first key grooves 51a of the hub 51, and the engagement pieces 55a of the second sleeve ring 55 are also engaged with the second key grooves 51b of the hub 51. Hence, the hub 51, the first keys 52, the second keys 53, the first sleeve ring 54, and the second sleeve ring 55 rotate integrally, the first sleeve ring 54 and the first keys 52 are capable of moving integrally in the axial direction, and the second sleeve ring 55 and the second keys 53 are capable of moving integrally in the axial direction.

In this example, the first sleeve ring 54 is formed separately from the first keys 52, and the second sleeve ring 55 is formed separately from the second keys 53. However, the first sleeve ring 54 and the second sleeve ring 55 may respectively be formed integrally with the first keys 52 and the second keys 53, as far as the first sleeve ring 54 and the first keys 52 rotate and move in the axial direction integrally and the second sleeve ring 55 and the second keys 53 rotate and move in the axial direction integrally.

When the hub 51 of the first switching device 50a configured as described above is fixed to the first main shaft 4 and the hub 51 of the second switching device 50b is fixed to the second main shaft 5, the condition shown in FIG. 2 is obtained. As shown in FIG. 2, the first switching device 50a and the second switching device 50b respectively include a first shift fork 56 for moving the first sleeve ring 54 in the axial direction and a second shift fork 57 for moving the second sleeve ring 55 in the axial direction. A linking groove 56a is formed in the first shift fork 56, and the first sleeve ring 54 is housed in the linking groove 56a to be free to rotate by approximately a half turn. Similarly, a linking groove 57a is formed in the second shift fork 57, and the second sleeve ring 55 is housed in the linking groove 57a to be free to rotate by approximately a half turn.

Hence, when the first shift fork 56 is moved in the axial direction of the first main shaft 4 and the second main shaft 5, the first sleeve ring 54 and the first keys 52 move in the axial direction while maintaining a rotation condition. Similarly, when the second shift fork 57 is moved in the axial direction of the first main shaft 4 and the second main shaft 5, the second sleeve ring 55 and the second keys 53 move in the axial direction while maintaining a rotation condition.

A first rod 58 that moves in the axial direction of the first main shaft 4 and the second main shaft 5 is fixed to the first shift fork 56, and a second rod 59 that moves in the axial direction of the first main shaft 4 and the second main shaft 5 is fixed to the second shift fork 57. An actuator that is activated by control of an electronic control unit ECU (a controller) is connected to each of the first rod 58 and the second rod 59. Hence, when the electronic control unit ECU controls the actuators such that the actuators are activated, the first keys 52 and the second keys 53 move in the axial direction of the first main shaft 4 and the second main shaft 5.

Figure 7:
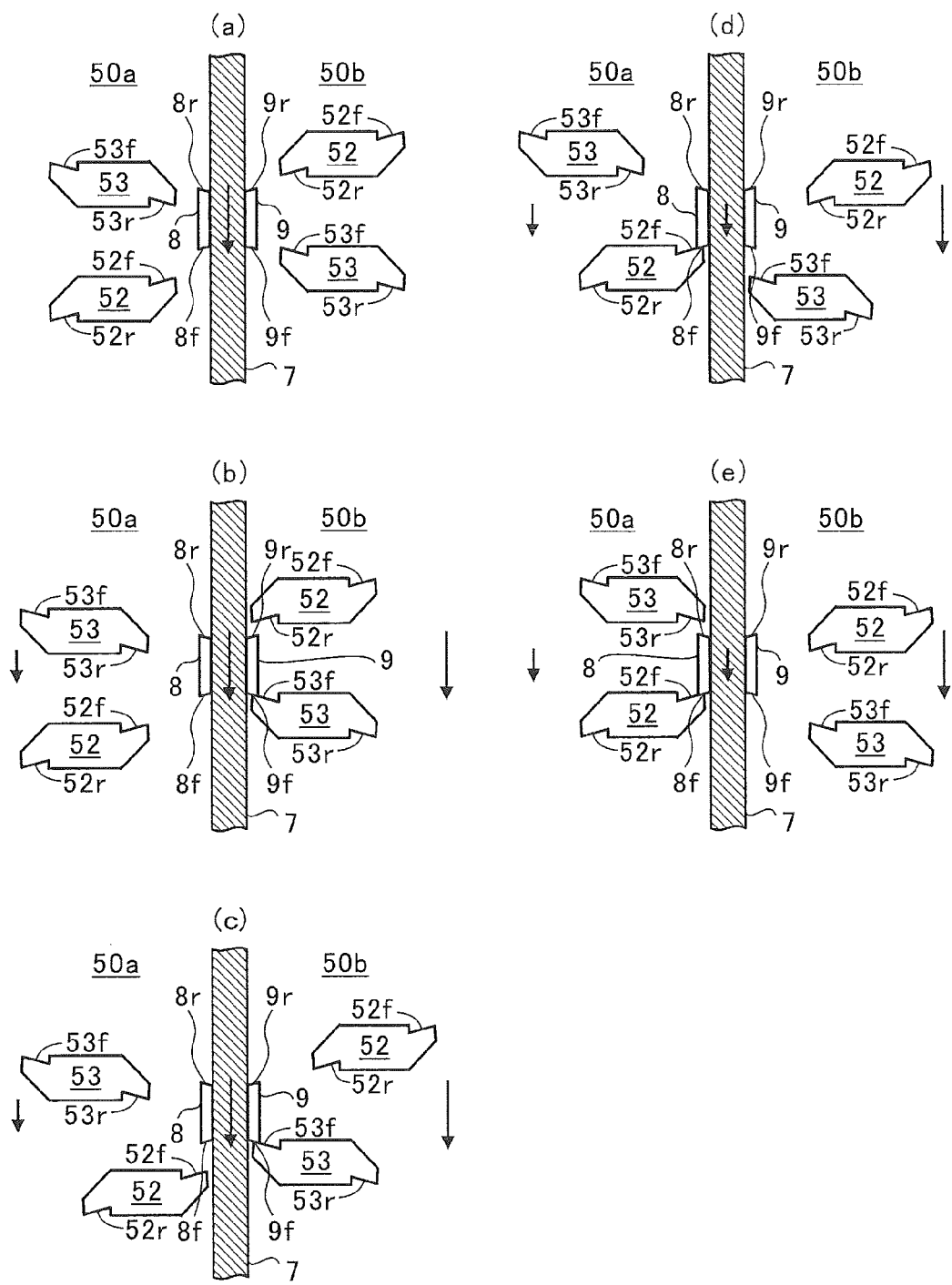
FIG. 7 is a view illustrating a switch in a power transmission path from a second main shaft to a first main shaft during acceleration.

FIG. 7 is a view illustrating a switch in the power transmission path from the second main shaft 5 to the first main shaft 4 during acceleration. Note that in the following description, "acceleration" denotes a condition in which the vehicle is accelerated by the driving force of the engine E, and not a condition in which the vehicle accelerates under its own weight while traveling downhill, for example. As shown in FIG. 7, in the shaft switching mechanism 50, the first switching device 50a is disposed on one side face of the rotation transmitter 7 provided with the first dogs 8, while the second switching device 50b is disposed on the other side face of the rotation transmitter 7 provided with the second dogs 9. It is assumed in the following description that when the vehicle travels forward, the rotation transmitter 7 (the input shaft 3), the first switching device 50a (the first main shaft 4), and the second switching device 50b (the second main shaft 5) all rotate in a direction indicated by a solid line arrow.

Each first dog 8 includes a leading surface 8f positioned on a rotation direction front side of the rotation transmitter 7 (the input shaft 3), and a trailing surface 8r positioned on a rotation direction rear side. The first dogs 8 are shaped to have a wide tip end, or in other words such that a width thereof in the rotation direction of the rotation transmitter 7 (the input shaft 3) is greater on a tip end side (the first switching device 50a side) than on a base end side (the rotation transmitter 7 side) in a projection direction. Similarly, each of the second dogs 9 includes a leading surface 9f positioned on the rotation direction front side of the rotation transmitter 7 (the input shaft 3), and a trailing surface 9r positioned on the rotation direction rear side. The second dogs 9 are shaped to have a wide tip end, or in other words such that a width thereof in the rotation direction of the rotation transmitter 7 (the input shaft 3) is greater on a tip end side (the second switching device 50b side) than on a base end side (the rotation transmitter 7 side) in the projection direction.

A leading pawl 52f (an engagement member) capable of engaging with the leading surface 8f of the first dog 8 is provided on one end (the rotation transmitter 7 side end) of each of the first keys 52 of the first switching device 50a, and a trailing pawl 53r (an engagement member) capable of engaging with the trailing surface 8r of the first dog 8 is provided on one end (the rotation transmitter 7 side end) of each of the second keys 53 of the first switching device 50a. The leading pawl 52f and the trailing pawl 53r are tapered so as to engage respectively with the leading surface 8f and the trailing surface 8r of the first dog 8 in a condition of surface contact therewith.

Meanwhile, a trailing pawl 52r (an engagement member) capable of engaging with the trailing surface 9r of the second dog 9 is provided on one end (the rotation transmitter 7 side end) of each of the first keys 52 of the second switching device 50b, and a leading pawl 53f (an engagement member) capable of engaging with the leading surface 9f of the second dog 9 is provided on one end (the rotation transmitter 7 side end) of each of the second keys 53 of the second switching device 50b. The trailing pawl 52r and the leading pawl 53f are tapered so as to engage respectively with the trailing surface 9r and the leading surface 9f of the second dog 9 in a condition of surface contact therewith.

The first keys 52 and the second keys 53 are shared by the first switching device 50a and the second switching device 50b. Therefore, the trailing pawl 52r is formed on another end of each first key 52 in the first switching device 50a, and the leading pawl 53f is formed on another end of each second key 53 in the first switching device 50a. Likewise, the leading pawl 52f is formed on the other end of each first key 52 in the second switching device 50b, and the trailing pawl 53r is formed on the other end of each second key 53 in the second switching device 50b. Note, however, that the trailing pawls 52r and leading pawls 53f of the first switching device 50a and the leading pawls 52f and trailing pawls 53r of the second switching device 50b are not essential.

As shown in FIG. 7A, when the electronic control unit ECU does not control the actuators, or in other words when both the first switching device 50a and the second switching device 50b are disconnected, the first keys 52 and the second keys 53 are all held in intermediate positions in a center of the hub 51. At this time, the first keys 52 and the second keys 53 are disengaged from the first dogs 8 and the second dogs 9 in the intermediate positions of the hub 51, and therefore the first main shaft 4 and the second main shaft 5 remain disconnected from the input shaft 3 so as to be capable of rotating relative thereto.

When, from this condition, a gear position is shifted to a first gear, for example, the second switching device 50b is connected so that the input shaft 3 and the second main shaft 5 rotate integrally via the second switching device 50b. More specifically, when the gear position is shifted to the first gear, the electronic control unit ECU moves the sleeve 102a of the gear switching mechanism 100a to the first driven gear 21 in advance, as described in relation to FIG. 1, thereby establishing a connected condition in which the output shaft 6 and the first driven gear 21 rotate integrally.

In this condition, the electronic control unit ECU controls the actuators to move the first keys 52 and second keys 53 of the second switching device 50b to the rotation transmitter 7, as shown in FIG. 7B. When the vehicle is in an acceleration condition at this time, the leading pawls 53f of the second keys 53 engage with the leading surfaces 9f of the second dogs 9 such that the rotary power of the input shaft 3 is transmitted to the second main shaft 5 via the second dogs 9 of the rotation transmitter 7 and the second keys 53, whereby the input shaft 3 and the second main shaft 5 rotate integrally. As a result, the driving force of the engine E is transmitted to the drive wheel via the input shaft 3, the rotation transmitter 7, the second switching device 50b, the second main shaft 5, the first drive gear 11, the first driven gear 21, and the output shaft 6 (see FIG. 1).

Further, when an upshift is performed from the first gear to a second gear while the vehicle accelerates, the electronic control unit ECU controls the actuators as follows. When an upshift is performed from the first gear to the second gear, the electronic control unit ECU moves the sleeve 102b of the gear switching mechanism 100b to the second driven gear 22 in advance, thereby establishing a connected condition in which the output shaft 6 and the second driven gear 22 rotate integrally (see FIG. 1). As a result, the rotary power of the output shaft 6 is transmitted to the first main shaft 4 via the second driven gear 22 and the second drive gear 12 such that the first main shaft 4 enters a rotary condition.

At this time, a rotation speed of the first main shaft 4 is lower than that of the rotation transmitter 7 (the input shaft 3), and therefore differential rotation occurs between the rotation transmitter 7 and the first switching device 50a. In this condition, the electronic control unit ECU controls the actuators to move the first keys 52 of the second switching device 50b in a direction heading away from the rotation transmitter 7 and to move the first keys 52 of the first switching device 50a to the rotation transmitter 7, as shown in FIG. 7C.

During acceleration at the first gear, the leading pawls 53f of the second keys 53 in the second switching device 50b are engaged with the leading surfaces 9f of the second dogs 9, whereas the first keys 52 and the trailing surfaces 9r of the second dogs 9 remain disengaged. The first keys 52 of the second switching device 50b can therefore be moved in the direction heading away from the rotation transmitter 7.

Further, the first keys 52 of the first switching device 50a and the first keys 52 of the second switching device 50b are moved by the same first rod 58, while the second keys 53 of the first switching device 50a and the second keys 53 of the second switching device 50b are moved by the same second rod 59 (see FIG. 2). Therefore, the actuators move the first keys 52 of the first switching device 50a in a direction for engaging with the first dogs 8 and move the first keys 52 of the second switching device 50b in a direction heading away from the second dogs 9 simultaneously, and move the second keys 53 of the second switching device 50b in a direction for engaging with the second dogs 9 and move the second keys 53 of the first switching device 50a in a direction heading away from the first dogs 8 simultaneously. As a result, situations in which the first keys 52 of the second switching device 50b engage with the second dogs 9 at the same time as the first keys 52 of the first switching device 50a are engaged with the first dogs 8 or the second keys 53 of the second switching device 50b engage with the second dogs 9 at the same time as the second keys 53 of the first switching device 50a are engaged with the first dogs 8 do not arise.

When the first keys 52 of the first switching device 50a move to the rotation transmitter 7 while differential rotation exists between the rotation transmitter 7 and the first switching device 50a, as shown in FIG. 7C, the leading pawls 52f of the first keys 52 of the first switching device 50a engage with the leading surfaces 8f of the first dogs 8, as shown in FIG. 7D. When the first keys 52 of the first switching device 50a engage with the first dogs 8 in this manner, the power transmission path is momentarily switched to the first main shaft 4 while the second main shaft 5 and the input shaft 3 remain in a power transmission condition. In other words, the power transmission path is momentarily switched to the second drive gear 12 and the second driven gear 22 while the power transmission condition via the first drive gear 11 and the first driven gear 21 remains established, and as a result, the gear shift is performed without torque interruption.

Furthermore, when the first keys 52 of the first switching device 50a engage with the first dogs 8 of the rotation transmitter 7 at this time, a rotation speed of the input shaft 3 decreases. As a result, a rotation speed of the second keys 53 of the second switching device 50b becomes higher than a rotation speed of the rotation transmitter 7, and therefore the engagement between the second keys 53 of the second switching device 50b and the second dogs 9 of the rotation transmitter 7 is released. Accordingly, the electronic control unit ECU controls the actuators to move the second keys 53 of the first switching device 50a to the rotation transmitter 7 and move the second keys 53 of the second switching device 50b in the direction heading away from the rotation transmitter 7. Simultaneously, the gear switching mechanism 100a is controlled to disconnect the first driven gear 21 from the output shaft 6. The acceleration upshift from the first gear to the second gear is thus completed, as shown in FIG. 7E.

Hence, with the transmission 1 according to this example, an upshift can be performed without causing torque interruption. Note that although an acceleration upshift from the first gear to the second gear was described here, an acceleration upshift from a third gear to a fourth gear is performed similarly.

Figure 8:
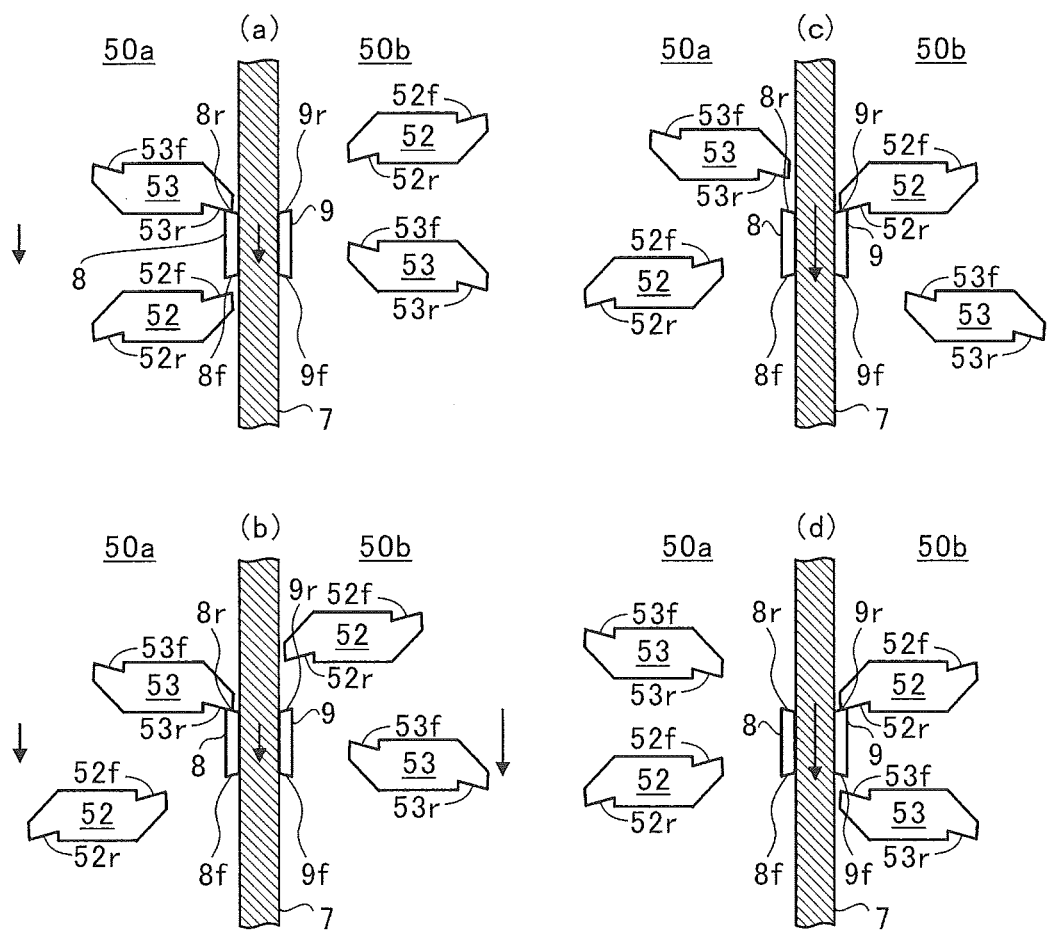
FIG. 8 is a view illustrating a switch in the power transmission path from the first main shaft to the second main shaft during deceleration.

FIG. 8 is a view illustrating a switch in the power transmission path from the first main shaft 4 to the second main shaft 5 during deceleration. Note that in the following description, "deceleration" denotes a condition in which the vehicle is decelerated by an engine brake, and not a condition in which the vehicle decelerates while traveling uphill, for example. It is assumed, for example, that an upshift from the first gear to the second gear has been performed in the manner described above such that the first main shaft 4 and the input shaft 3 are connected. As shown in FIG. 8A, when the vehicle travels in a deceleration condition at the second gear, the trailing pawls 53r of the second keys 53 in the first switching device 50a are engaged with the trailing surfaces 8r of the first dogs 8 such that the input shaft 3 and the first main shaft 4 rotate integrally via the second keys 53 of the first switching device 50a and the first dogs 8 of the rotation transmitter 7.

When a downshift is performed from the second gear to the first gear in this condition, the electronic control unit ECU controls the actuators as follows. When a downshift is performed from the second gear to the first gear, the electronic control unit ECU moves the sleeve 102b of the gear switching mechanism 100a to the first driven gear 21 in advance, thereby establishing a connected condition in which the output shaft 6 and the first driven gear 21 rotate integrally (see FIG. 1). As a result, the rotary power of the output shaft 6 is transmitted to the second main shaft 5 via the first driven gear 21 and the first drive gear 11 such that the second main shaft 5 enters a rotary condition.

At this time, a rotation speed of the second main shaft 5 is higher than that of the rotation transmitter 7 (the input shaft 3), and therefore differential rotation occurs between the rotation transmitter 7 and the second switching device 50b. In this condition, the electronic control unit ECU controls the actuators to move the first keys 52 of the first switching device 50a in the direction heading away from the rotation transmitter 7 and to move the first keys 52 of the second switching device 50b to the rotation transmitter 7, as shown in FIG. 8B.

During deceleration at the second speed, the trailing pawls 53r of the second keys 53 in the first switching device 50a are engaged with the trailing surfaces 8r of the first dogs 8, whereas the first keys 52 and the leading surfaces 8f of the first dogs 8 remain disengaged. The first keys 52 of the first switching device 50a can therefore be moved in the direction heading away from the rotation transmitter 7.

When the first keys 52 of the second switching device 50b move the rotation transmitter 7 while differential rotation exists between the rotation transmitter 7 and the second switching device 50b, the trailing pawls 52r of the first keys 52 in the second switching device 50b engage with the trailing surfaces 9r of the second dogs 9, as shown in FIG. 8C. When the first keys 52 of the second switching device 50b engage with the second dogs 9 in this manner, the power transmission path is momentarily switched to the second main shaft 5 while the first main shaft 4 and the input shaft 3 remain in a power transmission condition. In other words, the power transmission path is momentarily switched to the first drive gear 11 and the first driven gear 21 while the power transmission condition via the second drive gear 12 and the second driven gear 22 remains established, and as a result, the gear shift is performed without torque interruption.

Furthermore, when the first keys 52 of the second switching device 50b engage with the second dogs 9 of the rotation transmitter 7 at this time, the rotation speed of the input shaft 3 increases. As a result, a rotation speed of the second keys 53 of the first switching device 50a becomes lower than the rotation speed of the rotation transmitter 7, and therefore the engagement between the second keys 53 of the first switching device 50a and the first dogs 8 of the rotation transmitter 7 is released. Accordingly, the electronic control unit ECU controls the actuators to move the second keys 53 of the first switching device 50a in the direction heading away from the rotation transmitter 7 and move the second keys 53 of the second switching device 50b to the rotation transmitter 7. Simultaneously, the gear switching mechanism 100b is controlled to disconnect the second driven gear 22 from the output shaft 6. The deceleration downshift from the second gear to the first gear is thus completed, as shown in FIG. 8D.

Hence, with the transmission 1 according to this example, a downshift can be performed without causing torque interruption. Note that although a deceleration downshift from the second gear to the first gear was described here, a deceleration downshift from the fourth gear to the third gear is performed similarly.

According to the transmission 1, as described above, the first keys 52 and the second keys 53 of the first switching device 50a are moved to the first dog 8 such that either the leading surfaces 8f of the first dogs 8 engage with the first keys 52 or the trailing surfaces 8r of the first dogs 8 engage with the second keys 53, and as a result, a power transmission condition in which the input shaft 3 and the first main shaft 4 rotate integrally is established. Further, the first keys 52 and the second keys 53 of the second switching device 50b are moved to the second dog 9 such that either the leading surfaces 9f of the second dogs 9 engage with the second keys 53 or the trailing surfaces 9r of the second dogs 9 engage with the first keys 52, and as a result, a power transmission condition in which the input shaft 3 and the second main shaft 5 rotate integrally is established.

According to the shaft switching mechanism 50 described above, the power transmission path can be switched, or in other words a gear shift can be performed, without causing torque interruption. However, the first keys 52 and the second keys 53 engage with the first dogs 8 and the second dogs 9 while differential rotation exists, and therefore spike torque is generated. When spike torque is generated during a gear shift in this manner, an impact sound is generated by the engagement between the first keys 52 and second keys 53 and the first dogs 8 and second dogs 9, noise is generated when outer races of the bearings supporting the input shaft 3, the first main shaft 4, the second main shaft 5, and the output shaft 6 impinge on the transmission case, and so on. Moreover, the spike torque may generate torsion in the shafts and vibration in the drive wheel and the transmission case.

Therefore, in the transmission 1 according to this example, the damping mechanism 300 is provided in the input shaft 3 in order to cut the spike torque generated when the first keys 52 or the second keys 53 engage with the first dogs 8 or the second dogs 9 to a preset set torque. When torque generated in the input shaft 3 is smaller than a preset limit torque, the damping mechanism 300 causes the first input shaft 3a and the second input shaft 3b to rotate integrally, and when the torque generated in the input shaft 3 reaches or exceeds the limit torque, the damping mechanism 300 causes the first input shaft 3a and the second input shaft 3b to rotate relatively. As a result, torque transmission at or above the limit torque set by the damping mechanism 300 does not occur during power transmission between the first input shaft 3a and the second input shaft 3b, and therefore torque that is smaller than the limit torque is transmitted at all times. A configuration of the damping mechanism 300 will be described below.

Figure 9:
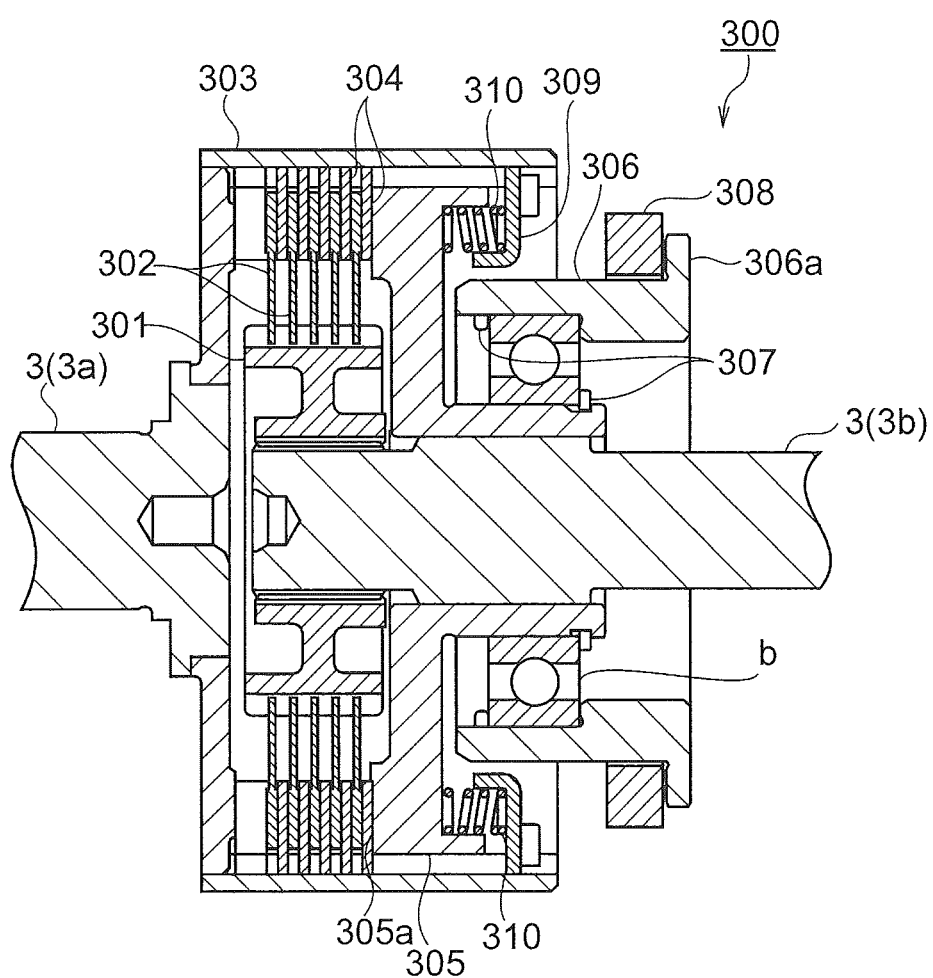
FIG. 9 is a schematic sectional view of a damping mechanism.

FIG. 9 is a schematic sectional view of the damping mechanism 300. The damping mechanism 300 according to this example is constituted by a so-called friction clutch type damping mechanism, and is provided between the first input shaft 3a and the second input shaft 3b. As shown in FIG. 9, the damping mechanism 300 includes a hub 301 that is spline-engaged to an end of the second input shaft 3b, and a thin disc-shaped inner plate 302 fixed to an outer periphery of the hub 301. The inner plate 302 is disposed in a plurality at intervals in the axial direction of the input shaft 3.

Further, an outer case 303 is fixed to an end of the first input shaft 3a, and a thin disc-shaped outer plate 304 is fixed to an inner peripheral surface of the outer case 303. The outer plate 304 is disposed in a plurality at intervals in the axial direction of the input shaft 3 such that the inner plates 302 and the outer plates 304 are laminated alternately in the axial direction of the input shaft 3.

Further, a pressure plate 305 is attached to the second input shaft 3b. The pressure plate 305 is capable of rotating integrally with the second input shaft 3b, and is spline-engaged to the second input shaft 3b to be capable of moving in the axial direction. The damping mechanism 300 also includes a cylindrical transmission member 306 into which the second input shaft 3b is inserted. An outer race of a bearing b is fixed to an inner peripheral surface of the transmission member 306, and an inner race of the bearing b is fixed to an outer peripheral surface of the pressure plate 305. At this time, axial direction movement of the bearing b relative to the pressure plate 305 and the transmission member 306 is restricted by a stopper 307. The pressure plate 305 and the transmission member 306 are therefore caused to rotate relatively and move integrally in the axial direction by the bearing b.

A flange 306a is formed on one end of the transmission member 306, and a release fork 308 is latched to the flange 306a. Although detailed description has been omitted, an actuator, not shown in the drawing, controlled by the electronic control unit ECU is connected to the release fork 308. When the electronic control unit ECU activates the actuator, the release fork 308 moves in the axial direction of the input shaft 3, whereby the transmission member 306, the bearing b, and the pressure plate 305 move integrally in the axial direction.

Further, a pressing surface 305a is provided on the pressure plate 305 in a position opposing the inner plates 302 and the outer plates 304, and the pressing surface 305a is in surface contact with the outer plate 304 disposed furthest toward the second input shaft 3b. A fixed piece 309 is fixed to the inner peripheral surface of the outer case 303, and an elastic member 310 constituted by a compression coil spring is interposed between the fixed piece 309 and the pressure plate 305. The elastic member 310 constantly applies a biasing force for biasing the pressure plate 305 to the first input shaft 3a, and as a result of the biasing force of the elastic member 310, clutch torque (a set torque) is generated between the inner plates 302 and the outer plates 304.

Hence, when the torque generated in the second input shaft 3b is smaller than the set torque, the damping mechanism 300 causes the first input shaft 3a and the second input shaft 3b to rotate integrally, and when the torque generated in the second input shaft 3b reaches or exceeds the set torque, the damping mechanism 300 causes the first input shaft 3a and the second input shaft 3b to rotate relatively. Note that the damping mechanism 300 is capable of modifying the set torque. More specifically, when the release fork 308 is moved by the control of the electronic control unit ECU, the pressing surface 305a of the pressure plate 305 moves integrally therewith. Accordingly, a pressure between the inner plates 302 and the outer plates 304 varies, and as a result, the set torque is modified.

By providing the input shaft 3 with the damping mechanism 300, the spike torque generated by the shaft switching mechanism 50 during a gear shift can be cut to the set torque. Therefore, noise and vibration generated during the gear shift can be suppressed sufficiently such that vibration in the vehicle or the like in which the transmission 1 is installed decreases, and as a result, passenger comfort in the vehicle can be enhanced. Further, by providing the input shaft 3 with the damping mechanism 300, gear shifts to all gear positions can be handled by the single damping mechanism 300. In contrast to the related art, therefore, damping mechanisms do not have to be incorporated into all gears, and as a result, reductions in cost and size can be achieved while securing a sufficient damping function.

Note that in the first example described above, the drive gears Dv are fixed respectively to the first main shaft 4 and the second main shaft 5, and the driven gears Dn that mesh respectively with the pluralities of drive gears Dv are provided to be free to rotate relative to the output shaft 6. Accordingly, the gear switching mechanisms 100a and 100b are provided on the output shaft 6 to switch selectively between the connected condition, in which a driven gear Dn is connected to the output shaft 6 such that the driven gear Dn rotates integrally with the output shaft 6, and the disconnected condition, in which the output shaft 6 and the driven gears Dn rotate relatively. However, the gear switching mechanisms 100a and 100b may be provided on the first main shaft 4 and the second main shaft 5 instead.

Figure 10:
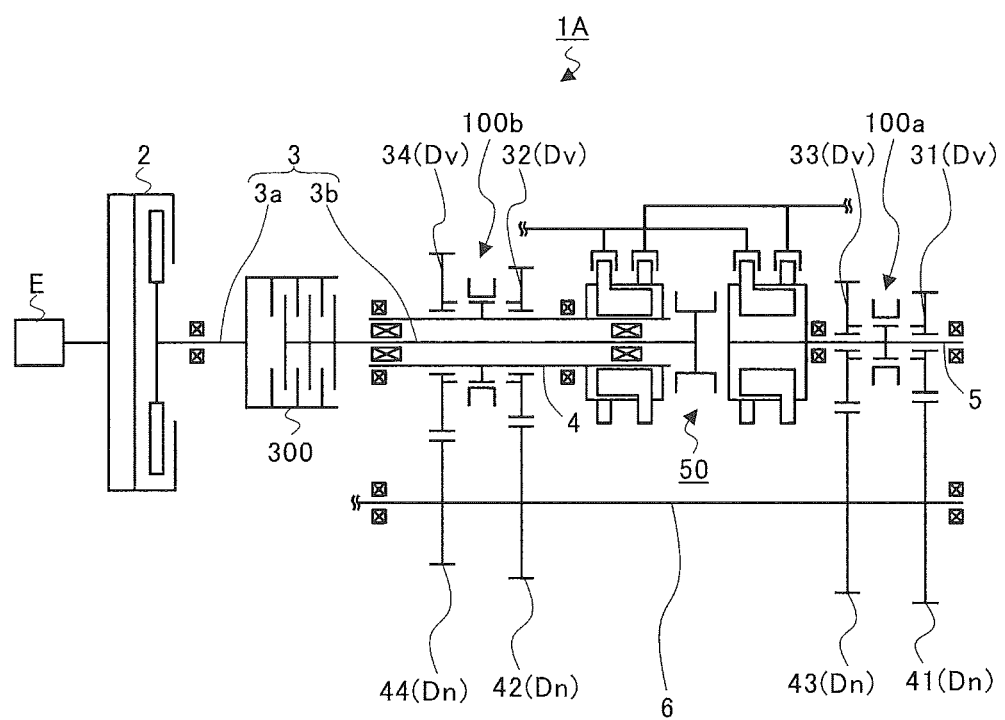
FIG. 10 is a schematic view showing a transmission for a vehicle according to a modified example.

FIG. 10 is a schematic view showing a transmission 1A for a vehicle according to a modified example. Note that in the modified example shown in FIG. 10, configurations of the drive gears Dv and driven gears Dn and attachment positions of the gear switching mechanism 100a and gear switching mechanism 100b differ from the first example, but all other configurations are identical to the first example. Hence, identical reference symbols have been allocated to the configurations that are identical to the first example, and description thereof has been omitted.

In the transmission 1A according to the modified example, pluralities of drive gears Dv (a first drive gear 31 to a fourth drive gear 34) are provided respectively on the first main shaft 4 and the second main shaft 5 to be free to rotate relative thereto. More specifically, the first drive gear 31 and a third drive gear 33 are provided on the second main shaft 5 to be free to rotate relative thereto, while a second drive gear 32 and the fourth drive gear 34 are provided on the first main shaft 4 to be free to rotate relative thereto. Meanwhile, driven gears Dn (a first driven gear 41 to a fourth driven gear 44) that mesh respectively with the drive gears Dv are fixed to the output shaft 6.

The gear switching mechanisms 100a and 100b configured as described in the first example are provided respectively on the second main shaft 5 and the first main shaft 4 in order to switch selectively between a connected condition in which a drive gear Dv is connected to the first main shaft 4 and the second main shaft 5 such that the drive gear Dv rotates integrally with the first main shaft 4 and the second main shaft 5, and a disconnected condition in which the drive gears Dv rotate relative to the first main shaft 4 and the second main shaft 5. Similar actions and effects to those described above can be realized likewise with the transmission 1A according to this modified example.

Second Example

Figure 11:
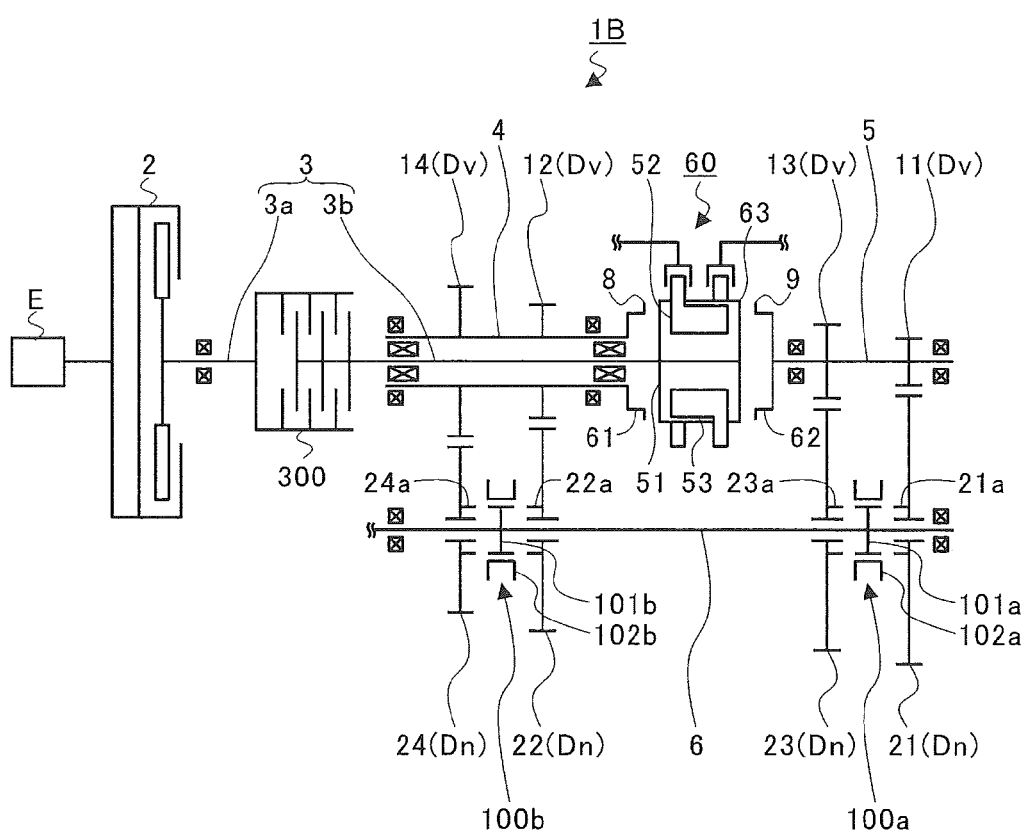
FIG. 11 is a schematic view showing a transmission for a vehicle according to a second example.
Figure 12:
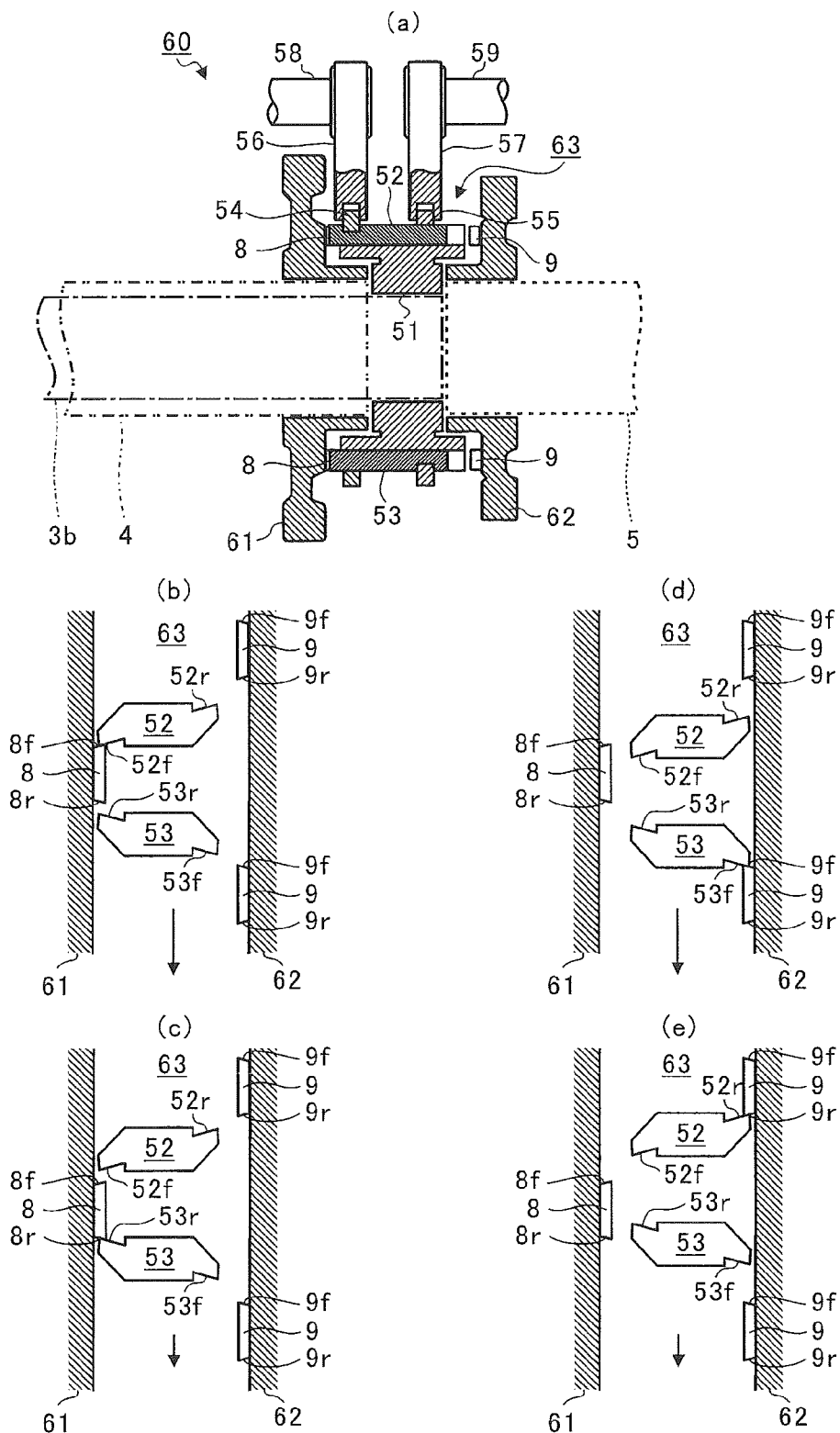
FIG. 12 is a schematic sectional view illustrating a shaft switching mechanism according to the second example.

FIG. 11 is a schematic view showing a transmission 1B for a vehicle according to a second example, and FIG. 12 is a schematic sectional view illustrating a shaft switching mechanism 60 according to the second example. In the second example shown in FIGS. 11 and 12, a configuration of the shaft switching mechanism 60 differs from that of the shaft switching mechanism 50 according to the first example, but all other configurations are identical to the first example. Hence, identical reference symbols have been allocated to the configurations that are identical to the first example, and description thereof has been omitted. The configuration of the shaft switching mechanism 60 will be described below.

The transmission 1B includes the shaft switching mechanism 60 for selectively switching the transmission path of the rotary power of the input shaft 3 between the first main shaft 4 and the second main shaft 5. Similarly to the shaft switching mechanism 50, the shaft switching mechanism 60 causes the input shaft 3 and the first main shaft 4 to rotate integrally when the first main shaft 4 is selected as the power transmission path, and causes the input shaft 3 and the second main shaft 5 to rotate integrally when the second main shaft 5 is selected as the power transmission path.

More specifically, the shaft switching mechanism 60 includes a rotation transmitter 61 that is spline-engaged to the end of the first main shaft 4 so as to rotate integrally with the first main shaft 4, a rotation transmitter 62 that is spline-engaged to the end of the second main shaft 5 so as to rotate integrally with the second main shaft 5, and a switching device 63 (a shaft switching device) that is provided in the site of the second input shaft 3b that projects from the first main shaft 4 and disposed in an opposing interval between the first main shaft 4 and the second main shaft 5.

The multiple first dogs 8 (six in this example) are provided on the rotation transmitter 61 at equal intervals in a circumferential direction so as to project from a side face thereof positioned on the switching device 63 side. Here, the first dogs 8 are provided on the first main shaft 4, and in each first dog 8, the leading surface 8f is provided on a rear side of a rotation direction (a direction of an arrow in FIG. 12B) of the first main shaft 4 while the trailing surface 8r is provided on a front side of the rotation direction of the first main shaft 4. Further, the multiple second dogs 9 (six in this example) are provided on the rotation transmitter 62 at equal intervals in a circumferential direction so as to project from a side face thereof positioned on the switching device 63 side. Here, the second dogs 9 are provided on the second main shaft 5, and in each second dog 9, the leading surface 9f is provided on a rear side of a rotation direction (the direction of the arrow in FIG. 12B) of the second main shaft 5 while the trailing surface 9r is provided on a front side of the rotation direction of the second main shaft 5.

The switching device 63 is configured identically to the first switching device 50a and the second switching device 50b of the shaft switching mechanism 50 described in the first example. The configurations of the first switching device 50a and the second switching device 50b were described above using FIGS. 2 to 7, and therefore detailed description of the switching device 63 has been omitted. Note, however, that the switching device 63 includes the hub 51 fixed to the input shaft 3 (the second input shaft 3b). Further, the switching device 63 includes the first keys 52 that are held by the hub 51 to be free to move in the axial direction of the input shaft 3, each first key 52 having the leading pawl 52f (the engagement member) that can be engaged with the leading surface 8f of the first dog 8 at one end and the trailing pawl 52r (the engagement member) that can be engaged with the trailing surface 9r of the second dog 9 at the other end, and the second keys 53 that are held by the hub 51 to be free to move in the axial direction of the input shaft 3, each second key 53 having the trailing pawl 53r (the engagement member) that can be engaged with the trailing surface 8r of the first dog 8 at one end and the leading pawl 53f (the engagement member) that can be engaged with the leading surface 9f of the second dog 9 at the other end.

During acceleration in a condition where the first keys 52 and second keys 53 of the switching device 63 are moved to the first dog 8, as shown in FIG. 12B, the leading surfaces 8f of the first dogs 8 engage with the first keys 52, whereas during deceleration in this condition, as shown in FIG. 12C, the trailing surfaces 8r of the first dogs 8 engage with the second keys 53. As a result, the power transmission condition in which the input shaft 3 and the first main shaft 4 rotate integrally is established. During acceleration in a condition where the first keys 52 and second keys 53 of the switching device 63 are moved to the second dog 9, on the other hand, the leading surfaces 9f of the second dogs 9 engage with the second keys 53, as shown in FIG. 12D, whereas during deceleration in this condition, the trailing surfaces 9r of the second dogs 9 engage with the first keys 52, as shown in FIG. 12E. As a result, the power transmission condition in which the input shaft 3 and the second main shaft 5 rotate integrally is established.

Likewise in the second example, the drive gears Dv are fixed respectively to the first main shaft 4 and the second main shaft 5, and the driven gears Dn are provided on the output shaft 6 to be free to rotate relative thereto. In the second example, however, similarly to the modified example described above, the p drive gears Dv may be provided respectively on the first main shaft 4 and the second main shaft 5 to be free to rotate relative thereto, and the driven gears Dn may be fixed to the output shaft 6. In this case, the gear switching mechanisms 100a and 100b may be provided respectively on the second main shaft 5 and the first main shaft 4.

Similar actions and effects to those of the first example can be realized likewise with the transmission 1B according to the second example. Moreover, with the transmission 1B according to the second example, only the single switching device 63 is required, and therefore a further reduction in size can be achieved in comparison with the transmission 1 according to the first example. With the transmission 1 according to the first example, on the other hand, the rotation transmitter 7, which is lighter than the switching device 63 of the second example, is provided on the input shaft 3, and therefore, with the transmission 1 according to the first example, inertia acting on the input shaft 3 when spike torque is generated can be reduced in comparison with the transmission 1B according to the second example, enabling an improvement in the damping function.

Note that in the shaft switching mechanism 50 according to the first example, the engagement members (the leading pawls and trailing pawls) that are capable of moving in the axial direction are provided on the first main shaft 4 and the second main shaft 5, and the dogs (the first dogs 8 and the second dogs 9) that engage with the engagement members to cause the first main shaft 4 or the second main shaft 5 to rotate integrally with the input shaft 3 are provided on the input shaft 3. In the shaft switching mechanism 60 according to the second example, on the other hand, the engagement members (the leading pawls and trailing pawls) that are capable of moving in the axial direction are provided on the input shaft 3, and the dogs (the first dogs 8 and the second dogs 9) that engage with the engagement members to cause the first main shaft 4 or the second main shaft 5 to rotate integrally with the input shaft 3 are provided on the first main shaft 4 and the second main shaft 5.

Hence, the shaft switching mechanism is not limited to the precise configurations of the examples described above as long as it includes engagement members (the leading pawls and the trailing pawls) provided either on the first main shaft 4 and the second main shaft 5 or on the input shaft 3 to be capable of moving in the axial direction of the input shaft 3, and dogs (the first dogs 8 and the second dogs 9) provided on the other of the first and second main shafts 4, 5 and the input shaft 3 so as to engage with the engagement members when the engagement members move, thereby causing either one of the first main shaft 4 and the second main shaft 5 to rotate integrally with the input shaft 3.

The examples of the present invention were described above with reference to the attached drawings, but the present invention is of course not limited to the examples described above, and needless to say, various modifications and amendments within the scope of the claims also belong to the technical scope of the present invention.

The present invention can be used mainly as a transmission for a vehicle.

The invention claimed is:

1. A transmission comprising:
   an input shaft that is rotated by a driving force of an engine, the input shaft including a first input shaft and a second input shaft;
   a first main shaft and a second main shaft disposed to be free to rotate relative to the input shaft;
   pluralities of drive gears fixed respectively to the first main shaft and the second main shaft;
   an output shaft disposed parallel to the input shaft, the first main shaft, and the second main shaft;
   driven gears disposed on the output shaft to be free to rotate relative thereto, the driven gears being configured to mesh respectively with the pluralities of drive gears;
   a gear switching mechanism to switch selectively between a connected condition in which a driven gear is connected to the output shaft such that the driven gear rotates integrally with the output shaft, and a disconnected condition in which the output shaft and the driven gears are capable of rotating relatively; and
   a shaft switching mechanism to switch a transmission path of a rotary power of the input shaft selectively between the first main shaft and the second main shaft,
   wherein the shaft switching mechanism includes:
      an engagement member provided either on each of the first main shaft and the second main shaft or on the input shaft to be capable of moving in an axial direction of the input shaft; and
      a dog provided on the other of each of the first and second main shafts and the input shaft so as to engage with the engagement member when the engagement member moves, thereby causing either one of the first main shaft and the second main shaft to rotate integrally with the input shaft,
   wherein an upstream end of the first input shaft is connected to the engine via a clutch in a transmission path for transmitting power from the engine,
   wherein a downstream end of the first input shaft is connected to a dampening mechanism including a friction plate that is disposed downstream of the clutch, the damping mechanism generating a sliding motion when a torque variation occurs as a result of the engagement between the engagement member and the dog, thereby cutting the torque variation to a preset set torque,
   wherein an upstream end of the second input shaft is connected to the damping mechanism,
   wherein a downstream end of the second input shaft is connected to the first main shaft,
   and
   wherein the damping mechanism is axially spaced from the clutch via the first input shaft so as to define two separate and independent arrangements.

2. The transmission according to claim 1, wherein the first main shaft is hollow, and
   the input shaft is inserted into an interior of the first main shaft to be free to rotate relative thereto.

3. The transmission according to claim 1, wherein pluralities of drive gears having respectively different gear ratios are provided on the first main shaft and the second main shaft such that drive gears having successive gear ratios are disposed alternately on the first main shaft and the second main shaft.

4. The transmission according to claim 1, wherein the shaft switching mechanism includes:
   a first switching device provided on the first main shaft;
   a second switching device provided on the second main shaft; and
   a first dog and a second dog that are provided on the input shaft and respectively include a leading surface on a front side of a rotation direction of the input shaft and a trailing surface on a rear side of the rotation direction of the input shaft,
   the first switching device includes:
      a hub fixed to the first main shaft;
      a first key that is held by the hub to be free to move in an axial direction of the first main shaft, the first key being provided with the engagement member at one end thereof to be capable of engaging with the leading surface of the first dog; and
      a second key that is held by the hub to be free to move in the axial direction of the first main shaft, the second key being provided with the engagement member at one end thereof to be capable of engaging with the trailing surface of the first dog,
   the second switching device includes:
      a hub fixed to the second main shaft;
      a second key that is held by the hub to be free to move in an axial direction of the second main shaft, the engagement member being provided at one end thereof to be capable of engaging with the leading surface of the second dog; and
      a first key that is held by the hub to be free to move in the axial direction of the second main shaft, the engagement member being provided at one end thereof to be capable of engaging with the trailing surface of the second dog,
   when the first key and the second key of the first switching device are moved to the first dog such that either the leading surface of the first dog engages with the first key or the trailing surface of the first dog engages with the second key, a power transmission condition in which the input shaft and the first main shaft rotate integrally is established, and
   when the first key and the second key of the second switching device are moved to the second dog such that either the leading surface of the second dog engages with the second key or the trailing surface of the second dog engages with the first key, a power transmission condition in which the input shaft and the second main shaft rotate integrally is established.

5. The transmission according to claim 4, further comprising an actuator for moving the first keys and the second keys of the first switching device and the second switching device,
wherein the actuator moves the first key of the first switching device in a direction for engaging with the first dog and moves the first key of the second switching device in a direction heading away from the second dog simultaneously, and moves the second key of the second switching device in a direction for engaging with the second dog and moves the second key of the first switching device in a direction heading away from the first dog simultaneously.

6. The transmission according to claim 1, wherein the first main shaft and the second main shaft are disposed opposite each other at a remove in the axial direction such that respective axial centers thereof are aligned,
the shaft switching mechanism includes:
a switching device provided on the input shaft in an opposing interval between the first main shaft and the second main shaft;
a first dog that is provided on the first main shaft, includes a leading surface on a rear side of a rotation direction of the first main shaft and a trailing surface on a front side of the rotation direction of the first main shaft, and projects toward the switching device; and
a second dog that is provided on the second main shaft, includes a leading surface on a rear side of a rotation direction of the second main shaft and a trailing surface on a front side of the rotation direction of the second main shaft, and projects toward the switching device,
the switching device includes:
a hub fixed to the input shaft;
a first key that is held by the hub to be free to move in the axial direction of the input shaft, the engagement member being provided at one end thereof to be capable of engaging with the leading surface of the first dog and at another end thereof to be capable of engaging with the trailing surface of the second dog; and
a second key that is held by the hub to be free to move in the axial direction of the input shaft, the engagement member being provided at one end thereof to be capable of engaging with the trailing surface of the first dog and at another end thereof to be capable of engaging with the leading surface of the second dog,
when the first key and the second key of the switching device are moved to the first dog such that either the leading surface of the first dog engages with the first key or the trailing surface of the first dog engages with the second key, a power transmission condition in which the input shaft and the first main shaft rotate integrally is established, and
when the first key and the second key of the switching device are moved to the second dog such that either the leading surface of the second dog engages with the second key or the trailing surface of the second dog engages with the first key, a power transmission condition in which the input shaft and the second main shaft rotate integrally is established.

* * * * *